Feb. 11, 1936.   G. A. MERCER, JR   2,030,263
YIELDING SUPPORT FOR VEHICLES
Filed Dec. 13, 1933   2 Sheets-Sheet 1
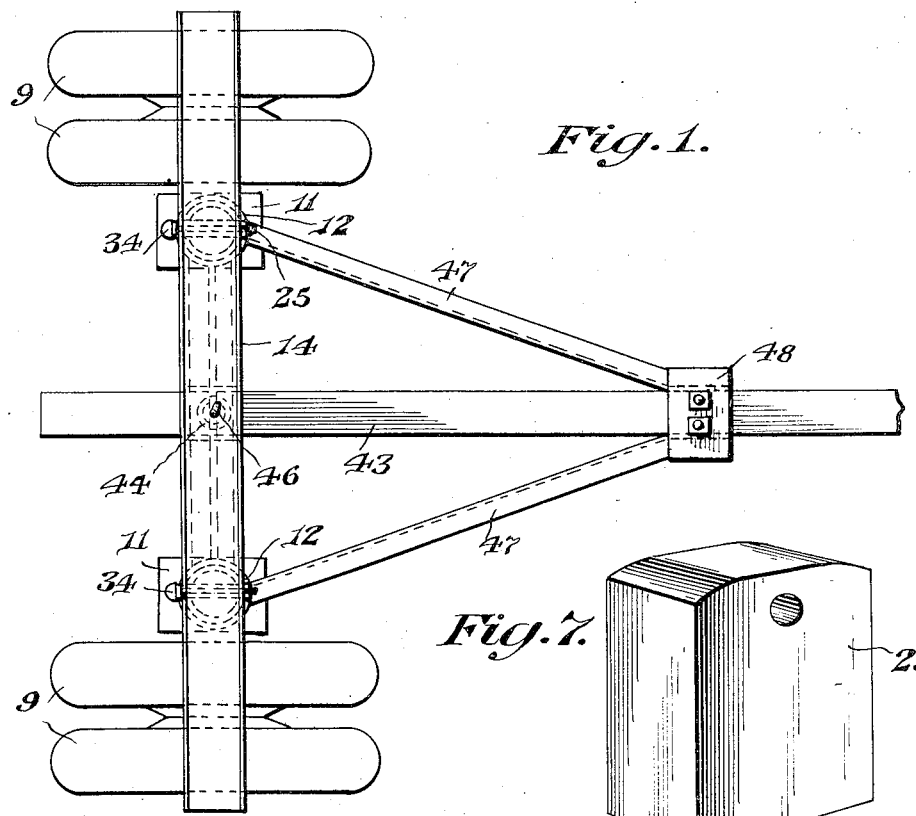
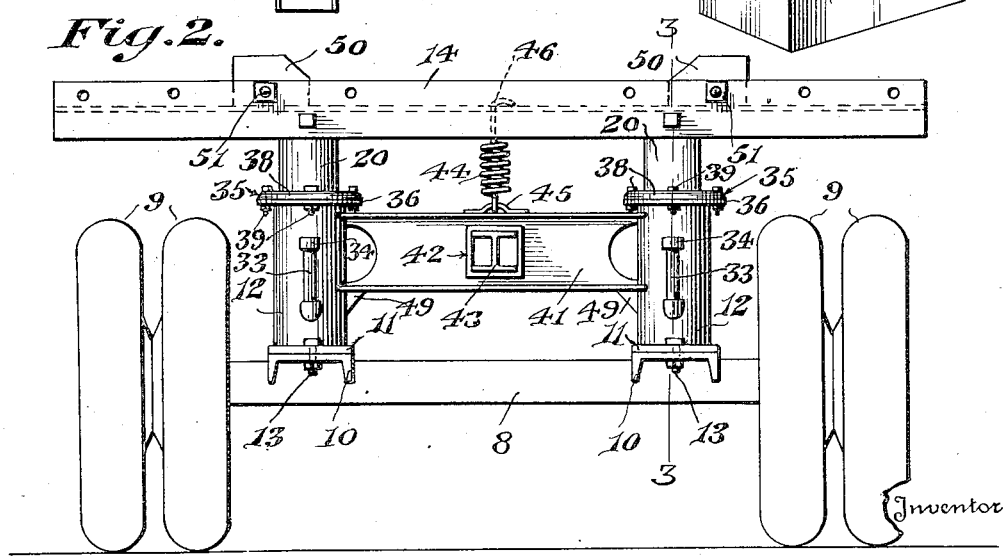
George Anderson Mercer, Jr., Feb. 11, 1936.   G. A. MERCER, JR   2,030,263
YIELDING SUPPORT FOR VEHICLES
Filed Dec. 13, 1933   2 Sheets-Sheet 2
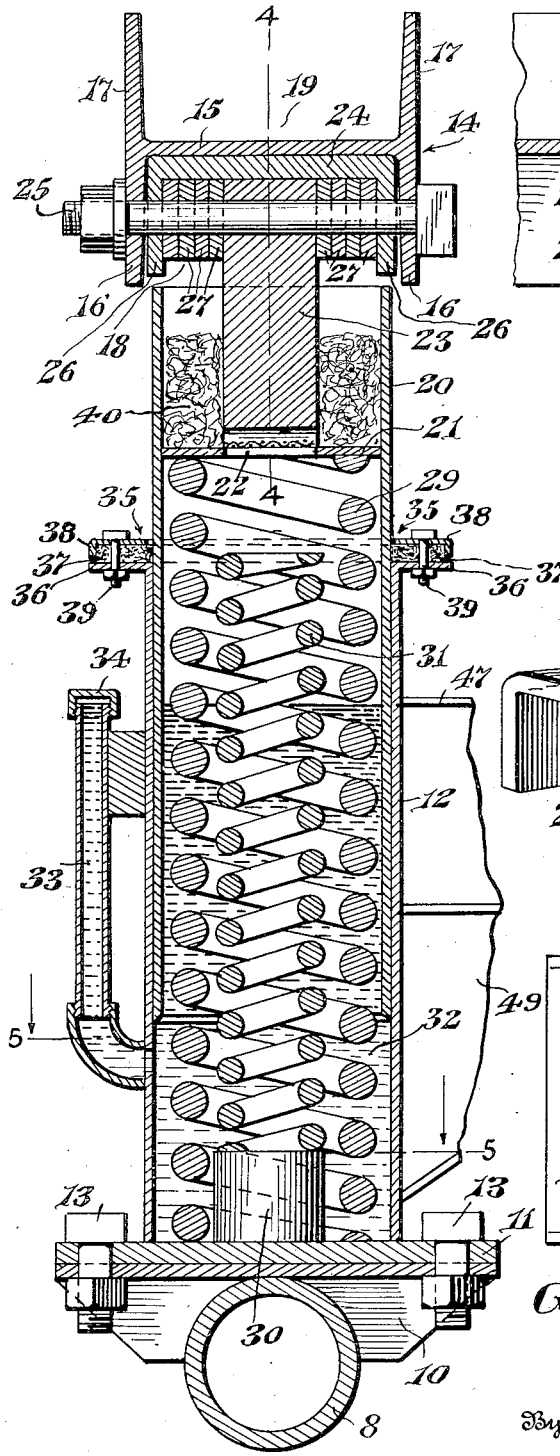
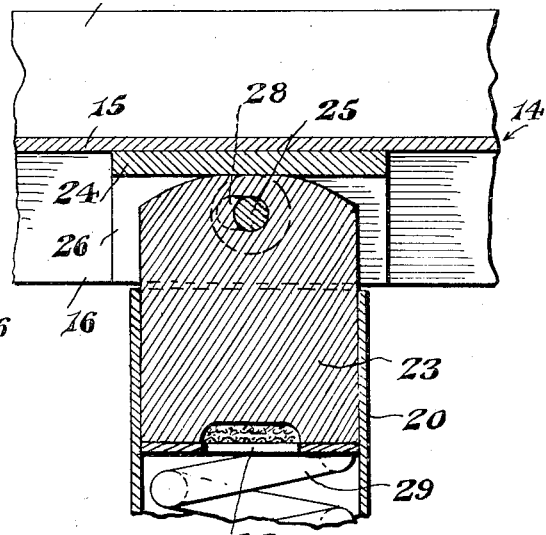
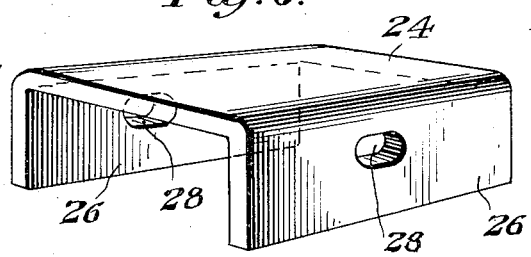
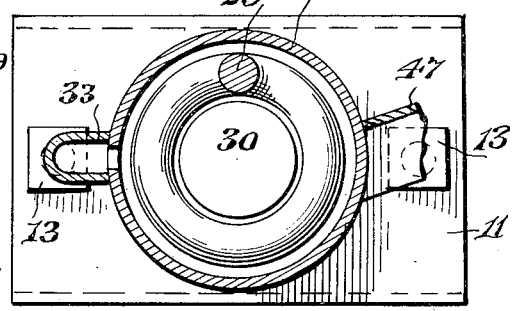
Inventor
George Anderson Mercer Jr.,
By
Attorney Patented Feb. 11, 1936

2,030,263

UNITED STATES PATENT OFFICE 2,030,263

YIELDING SUPPORT FOR VEHICLES

George Anderson Mercer, Jr., Savannah, Ga.

Application December 13, 1933, Serial No. 702,221

5 Claims. (Cl. 280—124)

The primary object of the present invention is to provide a simple structure of an effective character which will constitute an excellent yielding support for the load-carrying members of vehicles, and while particularly adapted for heavy trailers, is not limited to such use.

More specifically the object is to provide a practical spring support that employs coil springs instead of the usual multi-leaf elliptical springs, and to so mount the coil springs that in case of breakage the broken parts are maintained in operative relation and the load thus continues spring supported. Moreover the structure is such that the cost of replacement of a broken spring is much less than that of an elliptic spring of corresponding capacity.

A further object is to provide a structure of this character which will afford a rigid connection for the draft member of the vehicle, thus making the spring mechanism perform a double function.

In the accompanying drawings:—

Figure 1 is a plan view of an embodiment of the invention which is at present considered the preferable one.

Figure 2 is a rear elevation of the same.

Figure 3 is a cross sectional view on the line 3—3 of Figure 2.

Figure 4 is a detail sectional view on the line 4—4 of Figure 3.

Figure 5 is a horizontal sectional view on the line 5—5 of Figure 3.

Figure 6 is a perspective view of one of the bearing plates.

Figure 7 is a perspective view of the mounting block for the bolster.

In the embodiment disclosed, the structure is the rear end portion of a trailer for heavy loads. It includes an axle 8 on which are journaled sets of wheels 9. Fixed, as by welding, to the axle 8 adjacent the wheels are saddles 10 that extend on opposite sides of said axle, providing extended bases on which rest the heads 11 of upstanding cylinder members 12. The heads are extended beyond the cylinders to receive fastening bolts 13 that pass through the ends of the saddles, as clearly shown in Figure 3. The cylinders thus constitute cups or containers.

Overlying the axle is a bolster 14, preferably formed of an H-beam with its web 15 horizontally disposed and consequently with depending flanges 16 and upstanding flanges 17, providing an under channel 18 and an upper channel 19. Beneath the bolster are plunger cylinders 20 which slidably telescope in the lower cylinders 12. The plunger cylinders 20 have fitted into their upper end portions heads 21 provided with central openings 22, these heads being welded or otherwise secured to the cylinder walls. Also secured in the upper ends of the upper cylinders 20 above the heads 21, are blocks 23 that project above the tops of the cylinders 20 and enter the lower channel 18 of the bolster. These blocks bear against wear plates 24 fitted into the channel 18, and the parts are held in assembled relation by cross bolts 25 that pass through the depending flanges 16, through downwardly turned flanges 26 on the wear plates 24, and through suitable washers 27 located on opposite sides of the block 23. The openings 28, formed in the flanges 16 and which receive the bolts 25, are preferably elongated, as indicated in Figure 4, thus allowing the bolster to move to various inclined relations without placing undue strain on the parts.

The upper or plunger cylinders, and consequently the bolster are yieldingly supported by coiled main springs 29 that are housed within the cylinders, with their lower ends resting on the bases or heads 11 and their upper ends bearing against the heads 21. The lower ends of these springs are preferably centered by surrounding upstanding pintles 30 carried by the lower heads 11. Preferably also supplemental springs, as 31, of coiled formation are located within the main springs, their lower ends resting on the pintles 30, their upper ends terminating short of the heads 21, so that they will not come into resistant play until the main springs 29 have been compressed to a predetermined degree.

The lower cylinder members, as already stated, constitute cups or containers, and in the same are placed baths of oil 32 which lubricate the moving parts. In order to supply this lubricant, filling pipes 33 are mounted on the outer sides of the lower cylinder members and their bores open into the interior of these members. They are closed by suitable detachable caps 34. To prevent waste of this lubricant and also the entry of dust into the joints between the upper and lower members, the upper plunger members 20 slide through suitable packing glands 35 located at the upper ends of the lower cylinder members. These glands are preferably formed by locating on the upper ends of the lower cylinder members outstanding annular flanges 36 on which rest felt packing disks 37 that are clamped in place by rings 38 bolted, as shown at 39, to the flanges and compressed sufficiently to create pressure against the exteriors of the plunger cylinders 20.

In order to allow "breathing" of the supports, or in other words the ingress or egress of air, the openings 22 are provided in the upper heads 21, and to further prevent the ingress of dust or dirt to the interior, the spaces within the upper cylinders above the heads 21 preferably contain a suitable air filtering material 40, such as waste.

As will be clear by reference to Figure 2 the lower cylinder members 12 are rigidly connected above the axle 8 by a horizontal truss 41 whose ends are welded to the walls of said cylinder members. This truss in the present form of construction takes the form of an I-beam, and has a central opening 42. Through said opening the reach bar 43 slidably extends. To prevent too free upward movement of the bolster, and to prevent rattling due to loose bolted connections, a coiled spring 44 may be connected at its lower ends, as shown at 45, to this truss, and its upper end, as illustrated at 46, to the web 15 of the bolster. Hounds 47 diverge from a yoke 48, through which the reach 43 passes, these hounds preferably being channel bars and having their rear ends secured, as by welding, to the front sides of the lower cylinder members 12. It is also desirable to have reenforcing brackets 49 beneath the rear ends of the hounds 47 and connected to the lower portions of said cylinder members 12.

As will be clear by reference to Figures 1, 2 and 3, the structure is such that the upper channel 19 of the bolster is left unobstructed so that chock blocks 50, placed therein, can be slid to different positions without interference and bolted as indicated at 51.

It will be evident that as shown in Figures 1, 2 and 3, the assembly is a peculiarly strong and rigid one, in which the lower cylinder members not only act as part of the supporting means for the bolster, but as draft means connected to the rear axle. The yielding mounting has proven most effective and one that will withstand heavy loads. The structure moreover is very simple and is not liable to injury or excessive wear inasmuch as it is thoroughly lubricated and dust is excluded from the relatively movable contacting surfaces. The connections for the yielding supports are entirely on the underside of the bolster, making contact with the web thereof, but without the necessity of cutting through the same. This therefore not only creates an effective supporting connection but as already indicated leaves the upper face of the web free and the upper channel unobstructed. Furthermore the coil springs housed and guided as they are, will continue operative even if they break, thus avoiding the chance of the vehicle becoming unsprung as is the case with a broken elliptic spring. And a broken spring can be replaced with ease and expedition, making it a much less expensive job than with an elliptic spring.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a vehicular structure, the combination with an axle and a bolster above the same comprising an I-beam having upstanding and depending side flanges forming upper and lower channels, of yielding supports interposed between the axle and bolster and having their upper ends in the under channel of the latter and secured to the depending flanges, leaving the upper channel unobstructed, and chocks adjustably mounted in said unobstructed channel.

2. In a vehicular structure, the combination with an axle and a bolster above the same, said bolster comprising a channel beam having depending flanges forming an under channel, of spaced upstanding cylinders saddled on the axle, plunger sleeves telescoping the cylinders, springs housed by the sleeves and constituting yielding supports, and connections between the plunger sleeves and the bolster engaged in the under channel of said bolster, and secured to the depending flanges.

3. In a vehicular structure, the combination with an axle and a bolster above the same, said bolster comprising an H-beam having depending and upstanding flanges forming under and upper channels, of spaced upstanding cylinders saddled on the axle, plunger sleeves telescoping the cylinders, springs housed by the sleeves and constituting yielding supports, connections between the plunger sleeves and the bolster engaged in the under channel of said bolster, and bearing against the underside of the web of the H-beam, means passing through the depending flanges and securing the plunger sleeves to the bolster, and chocks adjustably mounted in the upper bolster channel.

4. In a vehicular structure, the combination with an axle and a load-carrying member thereabove, of a yielding support for the load-carrying member including a cylinder member mounted on the axle and a cylinder member telescoping the same, and having its opposite ends open, a spring within the cylinder members having bearings against both, and a connecting device secured to the load-carrying member and entering the upper open end of the upper cylinder member and having the portion therein secured thereto.

5. In a vehicular structure, the combination with an axle and a load-carrying member thereabove, of a yielding support for the load-carrying member including a cylinder member mounted on the axle and a cylinder member telescoping the same, and having its opposite ends open, a spring within the cylinder members having bearings against both, a connecting device secured to the load-carrying member and entering the upper open end of the upper cylinder member and having the portion therein secured thereto, and an air filter in the upper end of the upper cylinder member around the connecting device.

GEORGE ANDERSON MERCER, Jr.